United States Patent [19]

Vaidya

[11] Patent Number: 4,731,878
[45] Date of Patent: Mar. 15, 1988

[54] SELF-ROUTING SWITCH NODE COMBINING ELECTRONIC AND PHOTONIC SWITCHING

[75] Inventor: Avinash K. Vaidya, Naperville, Ill.

[73] Assignee: American Telephone and Telegraph Company, AT&T Bell Laboratories, Murray Hill, N.J.

[21] Appl. No.: 803,088

[22] Filed: Nov. 29, 1985

[51] Int. Cl.$^4$ ............................................... H04B 9/00
[52] U.S. Cl. ........................................ 455/600; 370/1; 370/60
[58] Field of Search ............................. 455/600, 607; 350/97.13, 97.14; 370/1, 58, 60, 94, 4

[56] References Cited

U.S. PATENT DOCUMENTS 3,573,377  4/1971  Anderson et al. ..................... 179/2
3,612,767  10/1971  Anderson et al. ............... 179/2 TV
4,494,230  1/1985  Turner ................................... 370/60

OTHER PUBLICATIONS

"4×4 Ti:LiNbO$_3$ Integrated-Optical Crossbar Switch Array", *Appl. Phys. Lett.* 47(4), Aug. 15, 1985, pp. 348-350.
"No. 1 ESS Switching Network Frames and Circuits", *The Bell System Technical Journal*, vol. XLIII, No. 5, Part 2, pp. 2221-2253, Sep., 1964.

*Primary Examiner*—Robert L. Griffin
*Assistant Examiner*—Leslie Van Beek
*Attorney, Agent, or Firm*—John C. Moran

[57] ABSTRACT

A switch node for the communication of circuit switched and packet information via parallel electrical and photonic connections within the node between input links and output links. The links each have electrical and optical sublinks. A node is responsive to an address received via the electrical sublink of an input link to establish both an electrical and photonic connection for the subsequent communication of both electrical and photonic data to an output link designated by the address. The switch node selects the designated output link from a set of similarly address designated output links all of which are equally capable of establishing the path. Based on this type of selection within the node, a switching network with a plurality of stages using the nodes has multipaths between any given input port to any output port.

22 Claims, 9 Drawing Figures

FIG. 9
LINK CONTROL 300 — FIG. 4 | FIG. 5

SELF-ROUTING SWITCH NODE COMBINING ELECTRONIC AND PHOTONIC SWITCHING

CROSS-REFERENCE TO RELATED APPLICATIONS

Concurrently filed herewith and assigned to the same assignee as this application is:

W. A. Payne,III 1, "Switching System Having Multiple Parallel Switching Networks," U.S. Ser. No. 803,091.

The following applications were filed on Sept. 26, 1984 and assigned to the same assignee as this application:

C. A. Lea Case 1, "Multiple Paths in a Self-Routing Packet and Packet and Circuit Switching Network," U.S. Ser. No. 654,765, now U.S. Pat. No. 4,656,622; and C. A. Lea and W. A. Montgomery, Case 2-3, "A Self-Routing Packet Switching Network with Intrastage Packet Communication," U.S. Ser. No. 654,763, now U.S. Pat. No. 4,661,947.

TECHNICAL FIELD

This invention relates to a method and switching architecture for the switching of packets and circuit switched information. The invention specifically pertains to a switching architecture utilizing self-routing switch nodes responsive to the electronic transmission of address information to communicate data at high rates over one of a multitude of paths using photonic communication.

BACKGROUND OF THE INVENTION

Self-routing multipath packet switching networks, such as those using banyan switching nodes, communicate packets through the switching network on the basis of address information contained within the packet or transmitted through the switching network prior to the transmission of the packet. One such system is described in U.S. Pat. No. 4,550,397, by J. S. Turner, et al. The latter describes a system in which switching network nodes automatically determine an alternate route through a switching network so as to increase reliability and distribute traffic. The switching network comprises stages of distribution and routing nodes. The routing nodes are responsive to physical addresses associated with the packets to communicate those packets to address designated downstream nodes. The distribution switching nodes statistically communicate packets to downstream switching nodes on the basis of an alternate routing algorithm and availability of downstream nodes. The initial network stages are alternate distribution and routing stages followed by only routing stages for the remaining stages of the network.

Another switching system that utilizes the address within a packet to route the packet through a multipath switching network is described in the previously mentioned application by C. A. Lea and W. A. Montgomery, Case 2-3. This application discloses a packet switching network in which self-routing packets are communicated through the network by intra-communication of the packets within a stage as well as inter-communication of packets among stages. The stages each have a plurality of pairs of switch nodes with each pair having an intra-node link between the pair of nodes. Each of the switch nodes comprise input controllers and output controllers. The input controller of a node is responsive to the receipt of a packet for interrogating the address field of the packet to determine the destination of the packet. That input controller, on the basis of the destination determination, communicates the packet towards the destination via either an inter-stage link or an intra-node link on the basis of availability of the links and an internal control circuit.

A self-routing multipath packet switching network that uses unbuffered banyan switching nodes to communicate packets through the network on the basis of address information transmitted through the switching network prior to the transmission of packets is described in the previously referenced application by C. A. Lea, Case 1. This self-routing network has a plurality of stages and the stages are interconnected by links. Each pair of switch nodes within a given stage share the same set of input links from the preceding stage. In respronse to the receipt of address information from a destination interface controller transmitted via a link, a pair of nodes determine one of a multitude of paths through the switching network by one of the pair responding to the address information to communicate the address information to the next sequential stage after establishing a path through that particular switch node. Once a path has been established through the switch node, an acknowledge signal is transmitted back from the network to the destinaticn trunk controller indicating that a path has been established. The path remains established until the end field of the packet is detected or the proper end information is transmitted after the transmission of the circuit switched information.

The self-routing multipath switching networks described have the capability of efficiently and rapidly setting up one of a multitude of paths through a switching network to interconnect a given input port to a given output port. However, the rate at which data can be transmitted over this path is limited by the fact that the switching nodes operate in the electronic domain, hence, are only capable of maximum bandwidths of approximately 50 Mbs for a serial stream. It is known to use parallel paths between switching nodes to increase the bandwidth somewhat, but this greatly complicates the interconnection problem between the nodes.

Photonic switching technology is capable of transmitting data at extremely high bandwidths; however, is not well suited for performing the control functiors. The reason why photonic switching technologies have difficulty in performing the control functions is that data path crossovers are very difficult to implement. The reason for this difficulty is that efficient waveguide crossovers require large angles of intersection in order to minimize the interface between adjacent waveguides. Since efficient integrated waveguide crossovers are difficult to fabricate in a photonic technology such as titanium diffused lithium niobate, it is difficult to include control functions. In addition, optical logic devices are difficult to implement and it is uneconomical and time inefficient to translate from the optical to the electrical domain to perform these control functions.

From the foregoing, it can be seen that there exists a need for a switch node that can combine the efficient route selection techniques of an electronic switch node with the data bandwidth of a photonic device. Furthermore, such a switch node should lend itself to utilization in a multipath switching architecture that requires the minimum number of switch nodes so that circuit switching can be performed in the same network that is doing packet switching. In addition to a photonic data path through the network, it is also desirable to maintain an electrical path for the transmission of control and auxiliary data information.

SUMMARY OF THE INVENTION

The aforementioned problems are solved and a technical advance is achieved in accordance with the principles of this invention incorporated in an illustrative method and switch node that allows simultaneous packet and circuit switching by the node responding advantageously to electronic addresses significantly to establish a photonic path and an electrical path through the switch node. The electronic addresses allow the information being communicated through a switching network using a plurality of the nodes to be self-routed between the nodes. Since an electrical circuit within the node is responsive to the addresses to set up not only an photonic path but also to set up an electrical connection, simultaneous electrical and photonic paths exist through the network.

Advantageously, the switch node allows a multiple-path switching network architecture to be implemented. The utilization of photonic data paths through the switch node allows for data to be communicated through the switching network at extremely high data rates. Also, the electronic path through the network can be used for the communication of control and auxiliary data information during the transfer of high-speed data on the photonic path.

Specifically, the switch node is intended for use in a switching network having a plurality of stages with the stages interconnected by links. The links each consist of an electrical sublink and an optical sublink. In response to an address received via the electrical sublink of an input link, the switch node establishes both an electrical path and an optical path through the node interconnecting that active input link and an address designated output link. After establishment of the paths, the switch node continues to communicate both electrical and optical data, thereby allowing for data transmission in both media.

Advantageously, the switch node implements a switching network having multiple paths between any given input port and output port. This capability is achieved by the switch node using the received address to select the address designated output link from a set of the output links connected to the switch node. Each link in this set is equally capable of being used to establish the path to the subsequent stage.

Also, the switch node comprises a photonic switching array whose optical switching devices are arranged in groups with each group being capable of switching a predefined input optical sublink to any of the output optical sublinks attached to the node. A circuit within the node that selects the address designated output link generates a signal that controls a switching optical device to interconnect the optical sublink of the active input link to the optical sublink of the address designated output link.

In addition, the path is further set up through the network by each switch node in a stage communicating the address to the downstream node connected to the address designated output link. When the last stage has processed the address and indicated a path has been established to a designated output port, then the latter port transmits an acknowledge signal to the last stage. Each node in the network path is then responsive to receipt of the acknowledge signal to relay that signal to next upstream node in the network path and set up the latter for the transmission of data on both the electrical and optical sublinks of the network path. Also, the switch node has a circuit for detecting end of transmission signals on the electrical sublink. When the end signals are detected, this circuit removes both the optical and electrical paths through the switch node.

The method for controlling a switch node that is part of a stage interconnected with other stages of a switching network by links which have electrical and optical sublinks and comprises the steps of selecting one of the output links of the node designated by an address received via an input link's electrical sublink and establishing both optical and electrical connection through the node between the input link and the address designated output link. Also, the method allows the communication of control and auxiliary data information via the electrical connection through node in addition to data communication over the established optical connection. By selecting the address designated output link from a set of similarly address designated output links, the method can establish multiple network paths.

DETAILED DESCRIPTION

Figure 1:
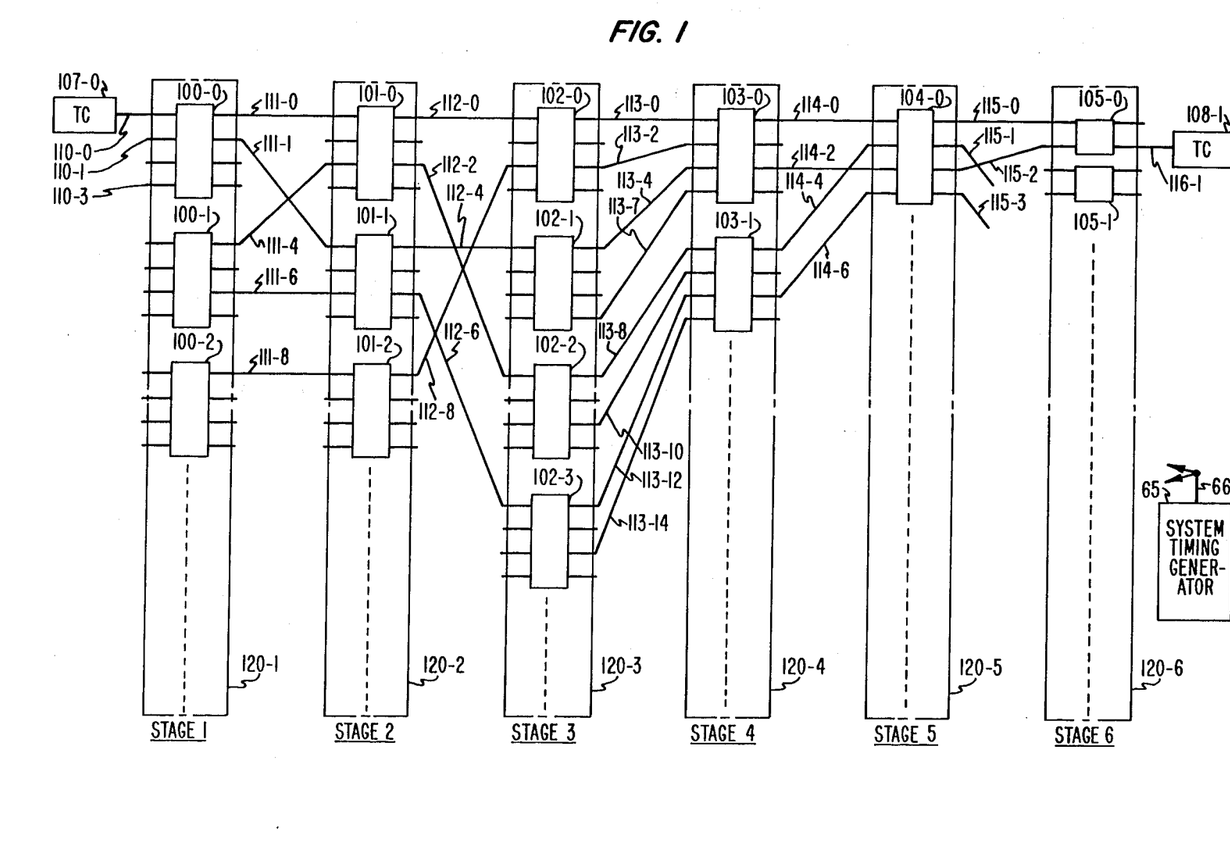
FIG. 1 illustrates, in block diagram form, a packet switching network utilizing the switch node which is the subject matter of this invention.

FIG. 1 shows an illustrative packet switching network utilizing the switch node which is the focus of this invention. The links interconnecting the switch nodes comprise an electrical cable or electrical sublink and optical fiber or optical sublink. A switch node, such as node 104-0, receives information on any of the four input links and can transmit this information out on any of four output links. The switching network illustrated in FIG. 1 has multiple paths between any input trunk controller and any output trunk controller. For example, there are a plurality of paths from trunk controller 107-0 to trunk controller 108-1 through the network illustrated in FIG. 1. Two such paths are via links 111-0, 112-0, 113-0, 114-0, 115-0, and 116-1; or links 111-1, 112-6, 113-14, 114-6, 115-2, and 116-1. It would be apparent to one skilled in the art that a number of other paths exist between trunk controllers 107-0 and 108-1 other than the two just recited. The manner in which the interconnections are made between the switch nodes of the various stages is described in greater detail in the copending application of C. A. Lea, U.S. Ser. No. 654,765, filed Sept. 26, 1984, which is hereby incorporated by reference into the present application.

A path through switching network of FIG. 1 is set up by trunk controller 107-0 transmitting address information through the network prior to the transmission of data information. Upon receipt, this address information is used by a switch node within a given stage to determine which two of the four outputs of the switch node are to be used to communicate the packet to the next subsequent stage. If both of the outputs are idle, then a predetermined one of the outputs is utilized; however, if only one output is available, then that output is used to communicate the packet to the subsequent stage.

Once a path has been set up through the switching network, the path remains set up until an end flag is transmitted by trunk controller 107-0 and received by each node in the path. The end flag contains the end bits indicating the end of transmission over this path. During packet transmission, the end flag is transmitted at the end of the packet; while during circuit switched transmission, the end flag is only transmitted when the path is to be removed because the data transmission is finished. The address and end flag are transmitted via the electrical cable portion of the interconnecting links of the path whereas the data information is transmitted via the optical fiber portion of the interconnecting links of the path. Each switch node has an electronic portion interfaced to the electrical cable and an optical portion interfaced to the optical fiber portion of the links. Extremely high bit rates can be utilized in the transmission of information through the optical paths allowing video signals to be transmitted through the switching network utilizing only one path. While the path is setup, additional control or auxiliary data information may also be transmitted via the electrical cable portion of the interconnecting links of the path.

Figure 2:
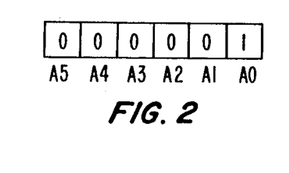
FIG. 2 illustrates the address information transmitted into the network illustrated in FIG. 1 by trunk controller 107-0.

Consider now, in greater detail, the routing or address information transmitted from trunk controller 107-0 to trunk controller 108-1 as illustrated in FIG. 2. The links illustrated in FIG. 1 include all of the available paths that can be utilized for switching information to trunk controller 108-1 from trunk controller 108-1. The path is set up through the switching network by trunk controller 107-0 first transmitting the address field illustrated in FIG. 2 and a setup signal during the path setup time to the switching network via input link 110-0. The path setup time is defined in the timing diagram illustrated in FIG. 6 along with other relevant timing information. The path setup time and other timing signals are determined by system timing generator 65. Each switch node, upon receipt of the address information and the setup signal, deletes the most significant bit of the address information that it receives. For example, a switch node in stage 120-1 receives all six address bits, A0–A5, and deletes the A5 bit and then retransmits to the second stage bits A0 through A4 and the setup signal. This process continues until the address field and setup signal reach stage 6 where a switch node receives only the A0 bit.

Further details of the determination of the path between trunk controller 107-0 to trunk controller 108-1 are now given. Switch node 100-0 is responsive to the address information on input link 110-0 to transfer this information and the setup signal to either links 111-0 or 111-1. Node 100-0 performs this transfer operation in response to the address information by directly interrogating which of the latter links is idle. If the address information and setup signal reach node 101-0 via link 111-0, it can be then be communicated to stage 120-3 via links 112-0 or link 112-2. Similarly, if the address information and setup signal are conveyed to node 101-1 via link 111-1, then switch node 101-1 can communicate the address and setup signal to either node 102-1 or 102-3.

Once the node of a stage, such as stage 120-2, is designated for transferring the address information, that node enters a wait state awaiting confirmation that a path has been completed to trunk controller 108-1. Upon receipt of this confirmation, the node enters a busy state and transfers the subsequent optical data information to the selected output link until the end flag is detected from trunk controller 107-0. Once this occurs, the node enters the idle state and removes the internal optical and electrical paths.

The previous discussion illustrates that there are four links available for transferring the address information and setup signal between stage 120-2 and stage 120-3 of FIG. 1 versus one link that would be available in the prior art such as described in U.S. Pat. No. 4,494,230 by J. S. Turner which describes a self-routing network with only a single path between two given trunk controllers.

From the previous discussion, it can be seen that the address information and setup signal can be transferred to stage 3 (stage 120-3) via links 113-0, 113-2, 113-4, 113-7, 113-8, 113-10, 113-12, or 113-14. Thus, the multipath network of FIG. 1 has eight possible output links to the third stage for transferring address information and setup signals along with the subsequent optical and electrical data.

The remaining stages of FIG. 1, namely stages 4, 5, and 6 (120-4, 120-5, and 120-6, respectively) concentrate the address information and setup signal down to link 116-1 which interconnects trunk controller 108-1 to the switching network. Trunk controller 108-1 is responsive to receipt of the setup signal from node 105-0 to transmit back an acknowledge signal to node 105-0. The latter is responsive to the acknowledge signal to retransmit the acknowledge signal to stage 5 via the link that had previously selected during the path setup operation. The acknowledge signal is then rippled back to trunk controller 107-0 via the previously setup path. When the acknowledge signal is received by trunk controller 107-0, it commences transmission of the optical data and electrical data if needed. As each node in the path that had been previously selected receives an acknowledge signal from the preceding node, the receiving node enters a busy state locking the path through the network until the end flag is received via the electrical cable. If the node, while in the wait state, does not receive the acknowledge signal, it is forced into the idle state during the next path setup time by the path signal.

Figure 3:
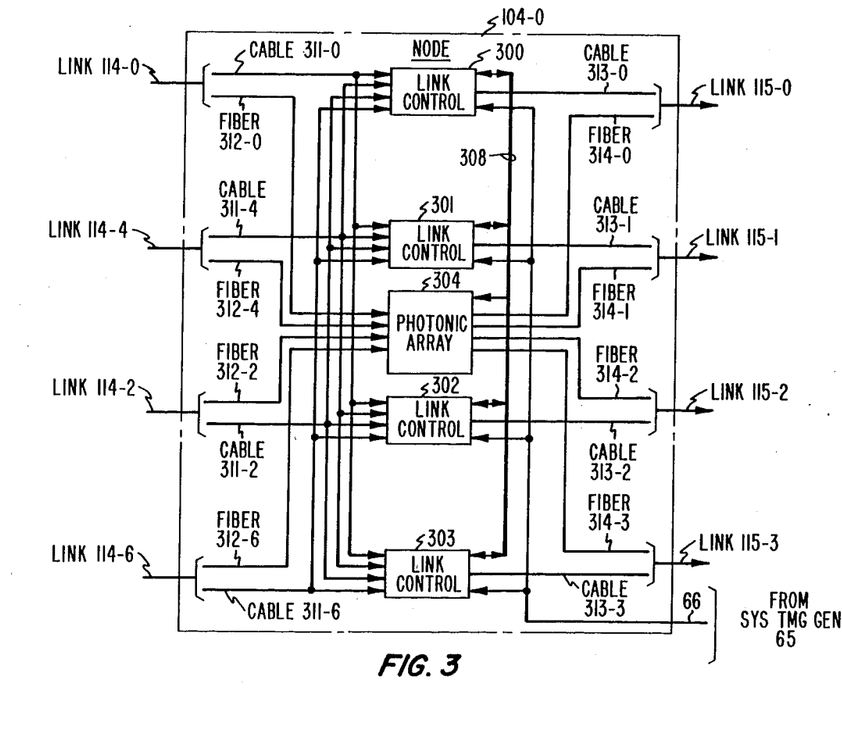
FIG. 3 illustrates, in block diagram form, switch node 104-0 of FIG. 1.

Switch node 104-0 is illustrated in greater detail in FIG. 3. The other nodes illustrated in FIG. 1 are identical in design with the exception of nodes used in stage 120-6 which are similar in design to node 104-0. The differences in design of the nodes of stage 6 and the other nodes, such as node 104-0, are explained in greater detail, with respect to FIGS. 3, 4, and 5. Node 104-0 comprises link control circuits 300 through 303 that interface to electrical cables 311-0, 311-4, 311-2, and 312-6, respectively, and photonic array 304 that interfaces to input fibers 312-0, 312-4, 312-2, and 312-6 to communicate optical information received on one of these fibers to an output fiber such as 314-0 under control of the signals received from the link control circuits via cable 308.

Figure 4:
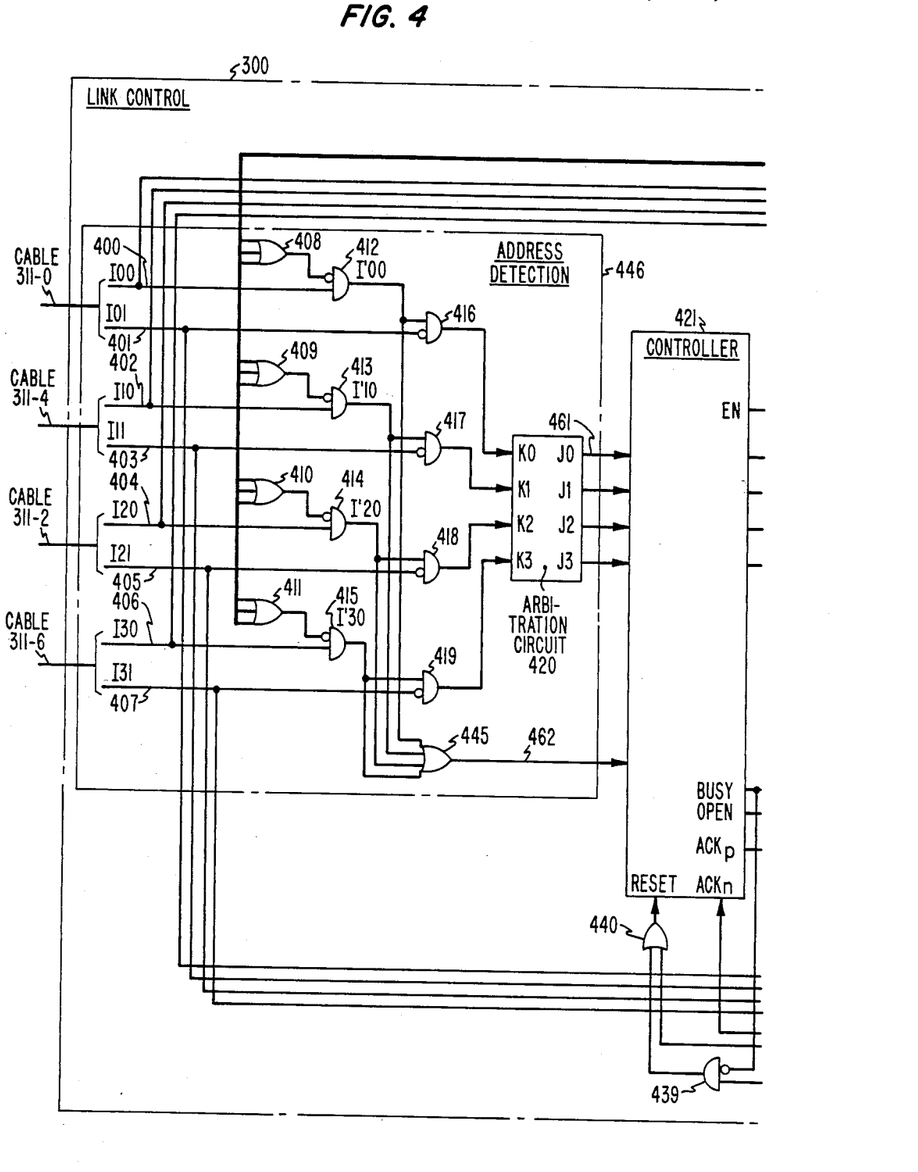
FIGS. 4 and 5 illustrate, in block diagram form, the details of link control circuit 300 of FIG. 3.
Figure 5:
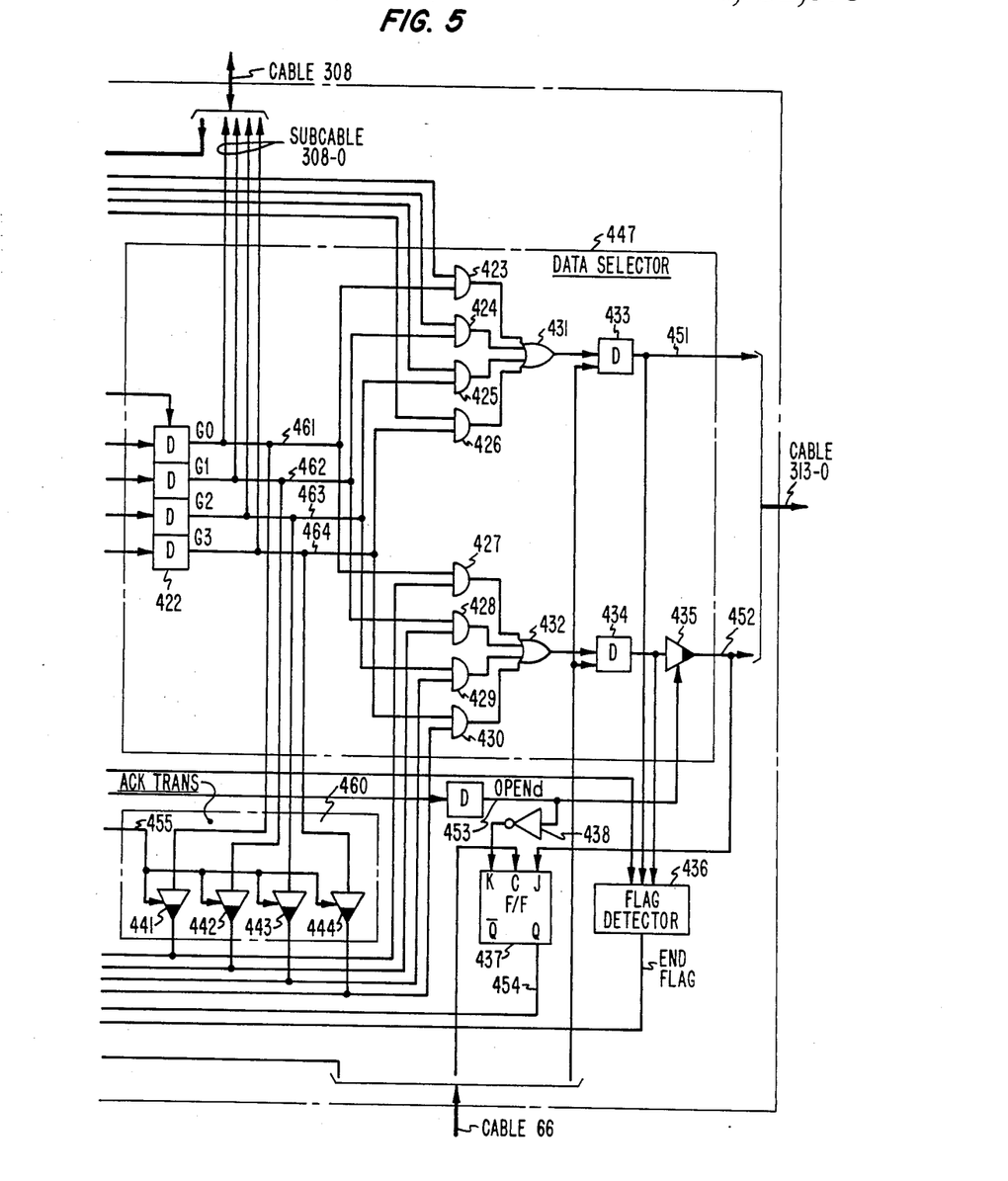
Figure 7:
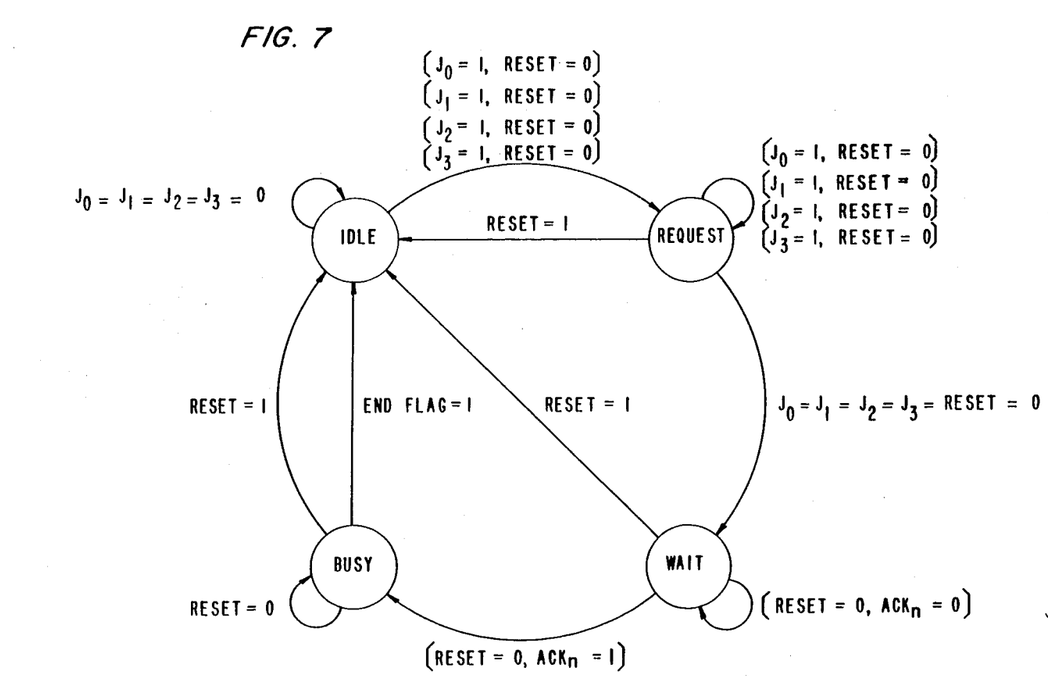
FIG. 7 illustrates a state diagram that defines the state transitions of controller 421 of FIG. 4.

As described in greater detail in the discussions of FIGS. 4 and 5, and as illustrated in FIG. 7, each link control circuit has four states: idle, setup, wait, and busy. When a link control circuit is in the idle state, it is responsive to the setup signal received via a cable to enter the setup state. While in the setup state, link control circuits 300 through 303 monitor cables 311-0 through 311-6 for the address information. If the most significant bit of the received address information is a "0", link control circuits 300 and 302 respond to the most significant bit being a "0" by establishing a path to either output link 115-0 or output link 115-2 if one of these output links is idle. The establishment of the path also takes place through photonic array 304 by the transmission of signals via cable 308 from either link control circuit 300 or 302. Conflicts are avoided since link control circuit 300 attempts to establish this communication path at a different point in time than link control circuit 302 utilizing timing information that is received from the system timing generator 65 via cable 66. If the most significant bit of the address information is a "1", link control circuits 301 and 303 attempt to establish a communication path through to links 115-1 and 115-3, respectively; whether or not a link control circuit can establish a path depends on whether or not the link connected to it is idle. If a link control circuit establishes the path, it then enters a wait state during which it continues to communicate the remaining address bits of the address information received via the electrical cable to the subsequent stages.

When the link control circuit receives an acknowledge signal back from the succeeding stage, it enters the busy state. If the link control does not receive the acknowledge signal before transmission of the next setup pulse indicating that no path was completed, the link control is placed in the idle state by the next setup signal. Once the link control circuit receives the acknowledge signal, it enters the busy state and remains in the busy state until the end flag is received via the input cable that is part of the setup path.

In addition to transferring control information to control the optical path through photonic array 304 via cable 308, the link control circuits utilize the information transmitted over cable 308 to determine whether or not a path is currently established for a given incoming link, such as link 114-0. The link control circuits use this information internally to keep from erroneously responding to address information and setup signals.

Each node of stage 6, as illustrated in FIG. 1, is similar in design to node 104-0, as illustrated in FIG. 3. The difference in design of a node of stage 6, such as node 105-0, is as follows. Node 105-0 only comprises link control circuits similar to link control circuits 300 and 303 and does not include link control circuits similar to link control circuits 301 and 302. Only two links, links 115-0 and 115-2, terminate on node 105-0, and there are only two output links. The result is that there is only a single path through node 105-0 for each address. Node 105-0 responds to the A0 address bit, and if the A0 address bit is a "0", then the link control circuit similar to link control circuit 300 responds to the address; whereas, if the A0 bit is a "1", then the link control circuit similar to link control circuit 303 responds to the address bit. The corresponding photonic array in node 105-0 is only half the size of photonic array 304 since there are only two input links and two output links connected to this array. Since there are no multiple paths, the link control circuits of node 105-0 do not utilize the information transmitted on cable 308, but rather, this information is only used by the corresponding photonic array.

Link control 300 is illustrated in greater detail in FIGS. 4 and 5. Link control 302 is identical in design; however, link control circuits 301 and 303 are different in that the lower inputs of gates 416 through 419 do not have a negative true input since these link control circuits respond to the most significant address bit being a "1".

As illustrated in FIGS. 4 and 5, each cable comprises two conductors, for example, cable 311-0 comprises conductors 400 and 401. As previously described, each of the four link control circuits within a node can independently be in one of four states: idle, setup, wait, and busy. When the link control circuit is in the busy state, the primary data is transferred during the busy state via fiber 312-0; however additional data and control information can be transferred via cable 311-0. During the idle, setup, and wait states, the two conductors within a given cable are designated as the even and odd conductors. For example, within cable 311-0, conductor 400 is designated as I00 (even conductor), and conductor 401 is designated as I01 (odd conductor).

Cable 311-4 comprises conductors 402 (I10, even conductor) and 403 (I11, odd conductor); cable 311-2 comprises conductors 404 (I20, even conductor) and 405 (I21, odd conductor); and cable 311-6 comprises conductors 406 (I30, even conductor) and 407 (I31, odd conductor). During the setup state, the originating trunk controller transmits a setup signal for six system clock signals on the even conductor and transmits the address information on the odd conductor for the same period rf time.

Figure 6:
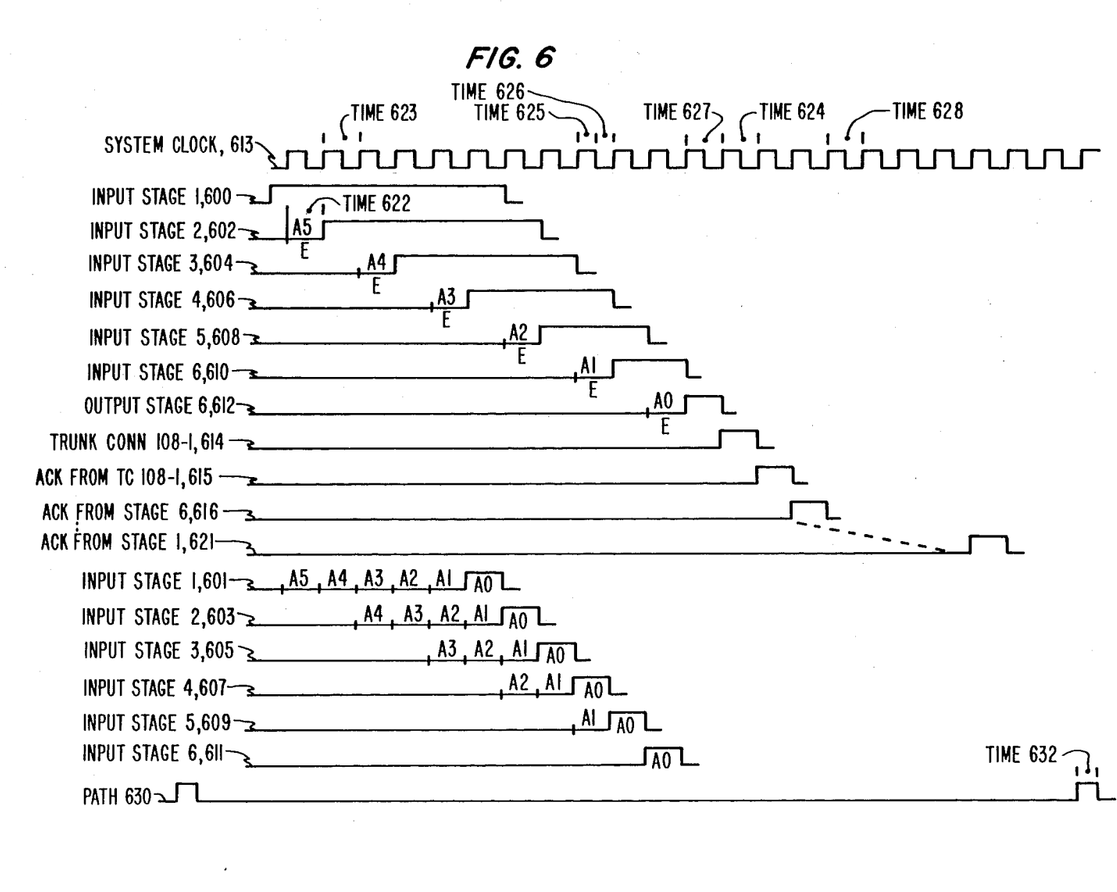
FIG. 6 illustrates a timing diagram that details the timing of the network of FIG. 1.

FIG. 6 shows the transmission which takes place between the six stages on the even and odd conductors during the path setup time. As illustrated on line 613, the system clock provides the fundamental timing for the switching nodes in the six stages; and the path signal on line 630 defines the start of path setup time. Initially, trunk controller 107-0 transmits the information shown on lines 600 and 601 to switching node 100-0 via the odd and the even conductors of link 111-0's cable, respectively. During time 622, the address detection circuit of node 100-0 is responsive to the setup signal on line 600 to interrogate the A5 address bit, a "0", that is being received on the odd conductor and is shown as the input to stage 1 on line 601. Switching node 100-0 is properly responsive to this information to transfer any subsequent information received on the odd and even conductor from trunk 107-0 to the selected node in stage 2 starting with time 623. The setup pulse and the address bits are transferred through the stages as illustrated by lines 602 through 612.

As will be described in greater detail later, at each stage, the node removes the most significant address bit. For example, stage 1 removed the A5 address bit. Since the A5 address bit has been removed in stage 1, the receiving node in stage 2 receives the A4 address bit as shown on line 603 simultaneously with the reception of the setup signal as shown on line 602. As shown in line 612, the node in stage 6 which received the information on the odd and even conductors transfers this to trunk controller 108-1 at a time 624. Trunk controller 108-1 is responsive to the setup signal to transfer back on the odd conductor an acknowledge signal. The acknowledge signal then is transferred through all the switching stages back to trunk controller 107-0 as illustrated in lines 615 through 621. When trunk controller 107-0 receives the acknowledge signal via stage 1, it then commences the transmission of the packet data.

Consider now the operation of link control 300 of FIG. 3 as illustrated in FIGS. 4 and 5. Link control circuits 301 through 303 are similar in design, and the differences are pointed out in the following discussion. Controller 421 performs the control functions for link control circuit 300. Address detection block 446 is operational during the setup state to detect the occurrence of the address bit being received from one of the attached cables and to ascertain that no other link control circuit of the node is currently switching data for that particular link. In addition, address detection block 446 detects the end of the setup state in order to signal controller 421 to transfer to the wait state. Address detection block 446 determines that the setup state is over when it is no longer receiving the setup signal.

Data selection block 447 is utilized to transfer address information from a selected cable to outgoing cable 313-0 of link control circuit 300. Data selection 447 becomes operational during the setup state after the first bit of the address information has been decoded; and the determination is made that link control circuit 300 is to communicate the remainder of the address information and setup signal to cable 313-0. Data selection block 447 is also operational during the busy state to transfer the information data from the selected input link to cable 313-0. However, during the wait state, data selection block 447 is not active and does not transfer any bits on cable 313-0. Since during the wait state, link control circuit 300 is awaiting the acknowledge signal from stage 6 via conductor 452 of cable 313-0.

Flag detector 436 is responsive to the receipt of the end flag indicating the end of transmission to signal controller 421 to enter the idle state. Acknowledge transmission block 460 is utilized by controller 421 to retransmit the acknowledge signal received from stage 6 back to stage 4.

As stated in the previous example, assume that the information shown as line 608 in FIG. 6 is being received on conductor 400 (even conductor) of cable 313-0 and that the information shown on line 608 of FIG. 6 is being received on conductor 401 (odd conductor). Further assume, that link control circuit 300 is in the idle state. Link control circuit 300 responds to this information on conductors 400 and 401 during time 625, and link control circuit 302 responds during time 626. This difference in response time avoids contention problems between the link control circuits and gives a predetermined priority of response.

In order to determine whether any other link control circuit is responding to information data or path setup information, gate 408 of address detection block 446 monitors signals from the other three link control circuits to ascertain that these circuits are not currently receiving packet data or path setup information on link 115-0. The monitoring is performed by OR gate 408 responding to the state G0 bit of link control circuits 301, 302, and 303 which are transferred to gate 408 via cable 308 from latcher similar to latch 422. If the output of OR gate 408 is a "0", this indicates that the link is not active for the transmission of packet data or path setup information in another link control cirruit of the node pair. Since the address bit on conductor 401 is a "0" (A3 as shown on line 604 of FIG. 6), the output of gate 416 transmits a "1" to arbitration circuit 420. A gate similar to gate 416 in link control circuits 301 and 303 only responds to an address bit A3 being a "1". Arbitration circuit 420's outputs, J0 through J3, respond to its inputs, K0 through K3, as defined by the following equations:

$$J0 = K0$$

$$J1 = \overline{K0} \, K1$$

$$J2 = \overline{K0} \, \overline{K1} \, K2$$

$$J3 = \overline{K0} \, \overline{K1} \, \overline{K3} \, K3$$

Arbitration circuit 420 is responsive to a "1" received on its K0 input from gate 416 to transmit a "1" to controller 421 via conductor 461. Controller 421 is responsive to a "1" on conductor 461 to leave the idle state and enter the setup state and to set the G0 bit position of latch 422 to a "1". When the G0 bit position is set, a "1" is transmitted via conductor 450 to gates 423 and 427, and the latter are enabled to transfer the subsequent information being received on conductor 400 and 401 to conductors 451 and 452 which are the conductors of output cable 313-0 via gate 431, gate 432, flip-flop 433 and flip-flop 434 plus gate 435. In addition, the fact that G0 bit in latch 422 has been set is transmitted via cable 308 to link control circuits 301, 302, and 303 to indicate that link 115-0 has been selected by link control circuit 300.

The transfer of subsequent information by data selection block 447 continues until time 627. At this time, gate 445 of address detection block 446 senses that link control circuit 300 is no longer receiving the setup signal on conductor 400 and transmits "0" signal indicating this fact to controller 421 via conductor 462. Controller 421 is responsive to receipt of a "0" via conductor 400 to enter the wait state. Upon entering the latter state, controller 421 prepares link control circuit 300 to receive the acknowledge signal from stage 6. Controller 421 transmits the OPENd signal via conductor 453 which disables gate 435 from transmitting on conductor 452 and also resets flip-flop 437.

When the acknowledge signal is received from stage 6 at a time 628, flip-flop 437 is set; and its Q output transmits a "1" via conductor 454 to controller 421. In response to a "1" on conductor 454, controller 421 retransmits the acknowledge signal to stage 2 and enters the busy state. Controller 421 retransmits the acknowledge signal to stage 4 by transmitting a "1" via conductor 455 to gates 441 through 444. Since the G0 output is a "1" and this fact is transmitted on conductor 450, gate 441 transmits ar acknowledge pulse on conductor 401 back to stage 4. In addition, the OPENd signal enables data selection block 447 to transmit data on conductor 452 by enabling gate 435.

If link control circuit 300 does not receive an acknowledge signal from stage 6 via conductor 452 before time 632 as shown in line 630 of FIG. 6, controller 421 is forced into the idle state by receipt of a signal from OR gate 440 and AND gate 439 upon receipt of the path signal by gate 439. One reason for an acknowledge signal not being received back from stage 6 is that it was impossible to set up a path to trunk controller 108-1. Forcing controller 421 to the idle state via OR gate 440 and AND gate 439 by the path signal, assures that the controller 421 does not remain in the wait state indefinitely.

While in the busy state, controller 421 transfers any subsequent control data received on conductors 400 and 401 to conductors 451 and 452, respectively, while monitoring the data being transferred to detect the end flag. When the end flag is detected by flag detector 436, (which is enabled by the busy signal), a signal indicating this fact is transmitted to controller 421 via OR gate 440. Controller 421 is responsive to the receipt of the end flag indication to enter the idle state.

The details of a node of stage 6, such as node 105-0, are similar to those described in the previous material, with respect to FIGS. 4 and 5. The differences are that in node 105-0, gates 408 through 415 are not required since it is not necessary to determine whether or not another link control circuit has responded to the same address bit. In addition, node 105-0 only has two input cables. Resulting in many of the circuits illustrated in FIGS. 4 and 5 being reduced by half to correspond to the fact that there are only two data paths versus four, as illustrated in the latter figures. One skilled in the art could readily design such a node as 105-0 based on the previous information and the details given in FIGS. 4 and 5.

Figure 8:
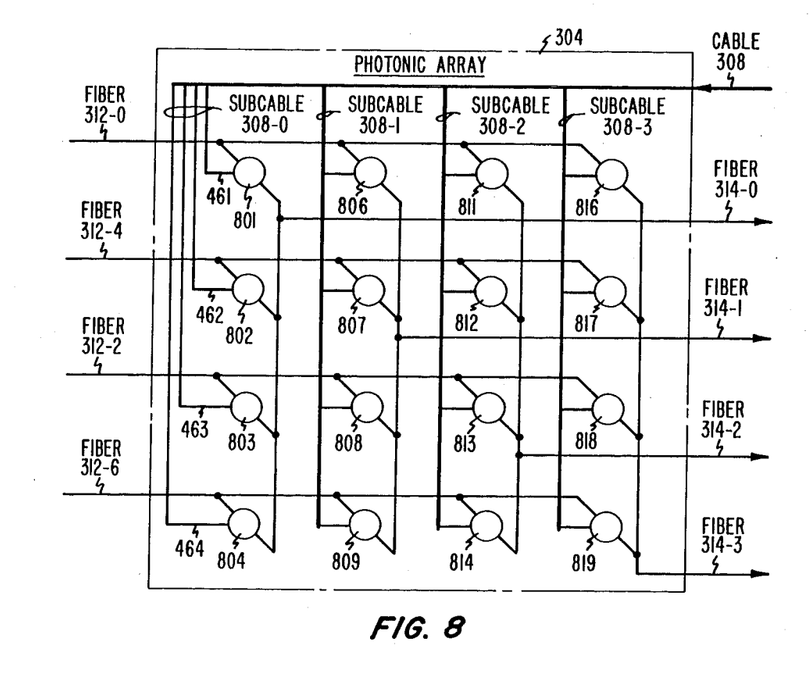
FIG. 8 illustrates the details of photonic array 304 of FIG. 3.
Figure 9:
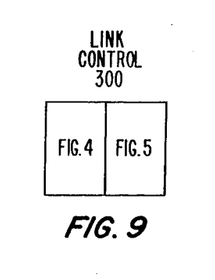
FIG. 9 illustrates how FIGS. 4 and 5 may be combined.

Photonic array 304 is illustrated in greater detail in FIG. 8. The switching devices illustrated in FIG. 8, such as device 801, are fabricated using titanium diffused lithium niobate technology. The manner of designing and fabricating such a device using this technology is described, for example, in the article by R. C. Alferness and R. V. Schmidt, "Directional Coupler Switches, Modulators and Filters Using Alternating $\Delta\beta$ Techniques," *IEEE Transactions on Circuits and Systems*, Vol. CAS-26, No. 12, December, 1979; U.S. Pat. No. 4,284,663 by J. R. Carruthers, et al.; and U.S. Pat. No. 4,439,265 by R. C. Alferness, et al. The photonic devices of array 304 are controlled by the link control circuits of node 104-0. Link control circuits 300 through 303 control devices 801 through 804, 806 through 809, 811 through 814, and 816 through 819 via subcables 308-0, 308-1, 308-2, and 308-3, respectively. In the previous example, detailed with respect to FIGS. 4 and 5, when cable 313-0 is selected, the G0 signal is transmitted on conductor 461 via subcable 308-0, and device 801 is responsive to the G0 signal to interconnect fiber 312-0 with fiber 314-0. The G0 also sets up the electrical path through node 104-0. The G1 through G3 signals are transmitted via conductors 462 through 464 and similarly control devices 802 through 804. It would be obvious to one skilled in the art to provide interface circuits so that latch 422 of FIG. 5 could properly drive the devices 801 through 804.

It is to be understood that the above-described embodiment is merely illustrative of the principles of the invention and that other arrangements may be devised by those skilled in the art without departing from the spirit and scope of the invention.

What is claimed is:

1. A switch node for use in a switching network having a plurality of sequential stages each stage comprising a plurality of said switch nodes for the communication of information between network input and output ports, said switch node comprising:
    means responsive to the receipt of electronic address signals for establishing an electronic path and photonic path from each stage to the next sequential stage; and
    means responsive to photonic data information received via the photonic path for switching the latter information through said switch node.

2. The switch node of claim 1 wherein said information comprises end signals indicating an end of communication of information and said switch node further comprises means for communicating subsequent data information received on said established electronic path through said switch node; and
    means responsive to receipt of said end signals from said electronic path for removing said established electronic and photonic paths.

3. The switch node of claim 1 wherein said establishing means comprises means responsive to said receipt of said electronic address signals for determining said electronic path and said photonic path from one of a plurality of address designated electronic paths and one of a plurality of address designated photonic paths, respectively, and to generate a determination signal defining said electronic path and said photonic path, thereby providing mutiple paths through said switching network.

4. The swtich node of claim 3 wherein said establishing means further comprises means for transferring said electronic address signals to a switch node of the next subsequent stage via said electronic path in response to said determination signal; and
    means responsive to receipt of an acknowledge signal from said switch node of said subsequent stage for setting up said electronic and photonic paths.

5. A switch node for use in a switching network having a plurality of sequential stages each stage comprising a plurality of said switch nodes with each of said stages interconnected by links to the previous stage and to the subsequent stage for the communication of ontrol and data information between stages and each switch node of a stage receives the information from an associated input set of the links from the previous stage and transmits the information via an associated output set of the links to the subsequent stage, comprising:
    each of said links comprises an optical transmission means and an electrical transmission means;
    said switch node comprises means responsive to receipt of electronic address signals from the electrical transmission means of one link of the associated input set of said links for selecting one link of the associated output set of links as designated by said electronic address signals and to generate a select signal defining said selected one link of the associated output set of links; and
    means controlled by said select signal for establishing an electronic path and photonic path between said one link of said associated input set of links to the selected one link of said associated output set of links.

6. The switch node of claim 5 further comprises means for communicating subsequent electronic data information received on said electrical transmission means of said one link of said associated input set of links to the electrical transmission means of said selected one link of said associated output set of links.

7. The switch node of claim 5 wherein said selecting means further comprises means for determining said selected one link of said associated output set of links from an address designated subset of said output set of links thereby allowing multiple paths through said switching network.

8. The switch node of claim 7 wherein said establishing means comprises means controlled by said select signal for generating a path signal; and means for photonically switching optical information received from the optical transmission means of said one link of said associated input set of links to the optical transmission means of said selected one link of said associated output set of links in response to said path signal.

9. The switch node of claim 8 wherein said photonic swith means comprises a plurality of optical switching devices arranged as groups with each of said groups capable of interconnecting the optical transmission means of an individual one link of said associated input set of links with any of the optical transmission means of said associated output set of links through an optical switching device of that group; and one of said optical switching devices of the group interconnected to said optical transmission means of said one link of said associated input set of links responsive to the receipt of said path signal for interconnecting the latter optical transmission means to said optical transmission means of said selected one link of said associated output links.

10. The switch node of claim 8 wherein said establishing means further comprises means for transferring said electronic address signals to the switch node interconnected to said selected one link of said associated output set of links in response to said select signal; and means responsive to receipt of an acknowledge signal from said switch node interconnected to said selected one link of said associated output set of links for setting up said electronic path and said photonic path.

11. The switch node of claim 10 wherein said control information further comprises end signals designating the end of information transmission further comprising means for detecting said signals designating the end of information transmission on said electrical transmission means of said one link of said associated input set of links and to generate a detect signal; and said establishing means further comprises means responsive to said detect signal for removing said electronic and said photonic paths through said switch node.

12. A switching network for interconnecting a plurality of input ports to a plurality of output ports and having a plurality of sequential stages each comprising a plurality of switch nodes with each of said stages interconnected by links for the communication of information between stages, comprising:

each of said links comprises an optical transmission means and an electrical transmission means;

each of said switch nodes comprises means responsive to receipt of address signals from the electrical transmission means of one of the links from a previous stage for selecting one of the links to the subsequent stage as designated by said address signals; and means controlled by said selecting means for establishing an electronic path and photonic path between said one of said links from said previous stage to the selected one of said links to said subsequent stage.

13. The switching network of claim 12 wherein said selecting means comprises means for determining said selected one of said links from a set of the links connected to said switch node from said subsequent stage and to generate a determination signal thereby creating multiple paths from any given input port to a given output port through said switching network.

14. The switching network of claim 13 wherein said establishing means further comprises means for transferring said address signals to the switch node of the subsequent stage interconnected to said selected one of said links to said subsequent stage in response to said determination signal; and means responsive to receipt of an acknowledge signal from said switch node interconnected to said selected one of said links to said subsequent stage for setting up said electronic path and said photonic path.

15. The switching network of claim 14 wherein said information comprises end signals desginating the end of information transfer and each of said switch nodes further comprises means for detecting said end signals received via said electrical transmission means of said one of the said links from said previous stage and to generate a detect signal; and said establishing means further comprises means responsive to said detect signal for removing said electronic and said photonic paths.

16. A method for controlling a switch node for use in a switching network having a plurality of sequential stages each stage comprising a plurality of said switch nodes with each of said stages interconnected by links to the previous stage and to the subsequent stage for the commuication of control and data information between stages and each switch node of a stage receives the information from an associated input set of links from the previous stage and transmits the information via an associated output set of links to the subsequent stage and each of said links comprises an optical sublink and an electrical sublink, comprising the steps of:

selecting one link of said associated output set of links as designated by electronic address signals received via the electrical sublink of one link of said assocaited input set of said links; and establishing an electrical path and a photonic path between said one link of said associated input set of links to the selected one link of said associated output set of said links.

17. The method of claim 16 further comprises the step of communicating subsequent electronic data information received on said one link of said associated input set of links to said selected one link of said associated output set of links.

18. The method of claim 17 wherein said step of seleting further comprises the step of determining said selected one link of said associated output set of links from an address designated subset of said associated output set of links thereby allowing multiple paths through said switching network.

19. The method of claim 18 wherein said switch node further comprises a photonic switching array and said step of establishing further comprises the step of generating a path signal; and photonically switching the optical information received from the optical sublink of said one link of said associated input set of links to the optical sublink of said selected one link of said associated output set of links in response to said path signal by said photonic switching array.

20. The method of claim 19 wherein said photonic switching array comprises a plurality of optical switching devices arranged as groups with each of said groups capable of interconnecting the optial sublink of an individual one of said associated input set of links with any of the optical sublinks of said associated output set of links through a switching device of that group and said step of photonically switching comprises the step of interconecting said optical sublink of said one link of said associated input set of links to said optical sublink of said selected one link of said associated output links in response to the receipt of said path signal by one of said optical switching devices.

21. The method of claim 19 wherein said step of establishing further comprises the step of transferring said address signals to the switch node of the subsequent stage interconnected to said selected one link of said associated output set of links; and setting up said electrical path and said photonic path in response to receipt of an acknowledge signal from said switch node interconnected to said selected one link of said associated output set of links in said subsequent stage.

22. The method of claim 21 wherein said control information comprises end signals designating the end of information transmission and said method further comprising the steps of:

detecting said end signals on said electrical sublink of said one of said input set of links; and removing said electronic and said photonic paths in response to the detection of said end signals.

* * * * *

UNITED STATES PATENT AND TRADEMARK OFFICE
CERTIFICATE OF CORRECTION

PATENT NO. : 4,731,878

DATED : March 15, 1988

INVENTOR(S) : Avinash K. Vaidya

It is certified that error appears in the above-identified patent and that said Letters Patent is hereby corrected as shown below:

Column 12, line 20, "swtich" should read "switch", and

Col. 13, line 8, "swith" should read --switching--.

Signed and Sealed this

First Day of June, 1993

Attest:

MICHAEL K. KIRK

*Attesting Officer*      *Acting Commissioner of Patents and Trademarks*